United States Patent [19]
Kanou

[11] Patent Number: 5,345,683
[45] Date of Patent: Sep. 13, 1994

[54] ROTARY CUTTER FOR MOWING MACHINE

[76] Inventor: Takahiro Kanou, 15172-2, Kaminoho-mura, Mugi-gun, Gifu-ken 501-36, Japan

[21] Appl. No.: 930,410
[22] PCT Filed: Jan. 14, 1992
[86] PCT No.: PCT/JP92/00021
§ 371 Date: Sep. 10, 1992
§ 102(e) Date: Sep. 10, 1992
[87] PCT Pub. No.: WO92/11748
PCT Pub. Date: Jul. 23, 1992

[30] Foreign Application Priority Data
Jan. 14, 1991 [JP] Japan .................. 3-021181[U]
Nov. 29, 1991 [JP] Japan .................. 3-106684[U]

[51] Int. Cl.⁵ .................................. B26B 27/00
[52] U.S. Cl. .................................... 30/276
[58] Field of Search .......... 30/276, 347; 56/12.5, 56/12.7, 127

[56] References Cited

U.S. PATENT DOCUMENTS

| | | | |
|---|---|---|---|
| 4,134,204 | 1/1979 | Perdue | 30/276 |
| 4,168,572 | 9/1979 | Ewing | 30/276 |
| 4,203,212 | 5/1980 | Proulx | 30/276 |
| 4,738,085 | 4/1988 | Nishio et al. | 56/12 |
| 4,779,405 | 10/1988 | Everts | 30/276 |
| 4,813,140 | 3/1989 | Calcinai | 30/276 |
| 4,823,465 | 4/1989 | Collins | 30/276 |
| 4,882,842 | 11/1989 | Baba | 30/276 |
| 5,095,688 | 3/1992 | Fabrizio | 30/276 |

FOREIGN PATENT DOCUMENTS

0203011 11/1986 European Pat. Off. .
0215416 3/1987 European Pat. Off. .

Primary Examiner—Richard K. Seidel
Assistant Examiner—Paul M. Heyrana
Attorney, Agent, or Firm—Hedman, Gibson & Costigan

[57] ABSTRACT

When a nylon cord is used as a cutter for mowing weeds and lawns, extraction and replacement of the nylon cord are facilitated. A reel (5) having a cylindrical member (6) is inserted on a bearing (4) of a case body (1). A through hole (12) extends through the cylindrical member (6) to be perpendicular to the axis of rotation of the cylindrical member (6) outside the inner diameter portion of the cylindrical member (6). A guide member (14) having pawls (13) and a pin press (16) having pawl presses (15) are provided in the cylindrical member (6). End portions (15b) of the pawl presses (15) corresponding to trough portions (13b) are inclined with respect to the upper surface of a support flange (11) at an appropriate acute angle. A main shaft (20) is inserted in the bearing (4). A stopper pin (22) to engage with the guide member (14) is provided in the main shaft (20). A coil spring (25) is provided between the main shaft (20) and a cap (23) to bias the main shaft (20), thereby enabling guiding and engagement of the stopper pin (22).

2 Claims, 3 Drawing Sheets

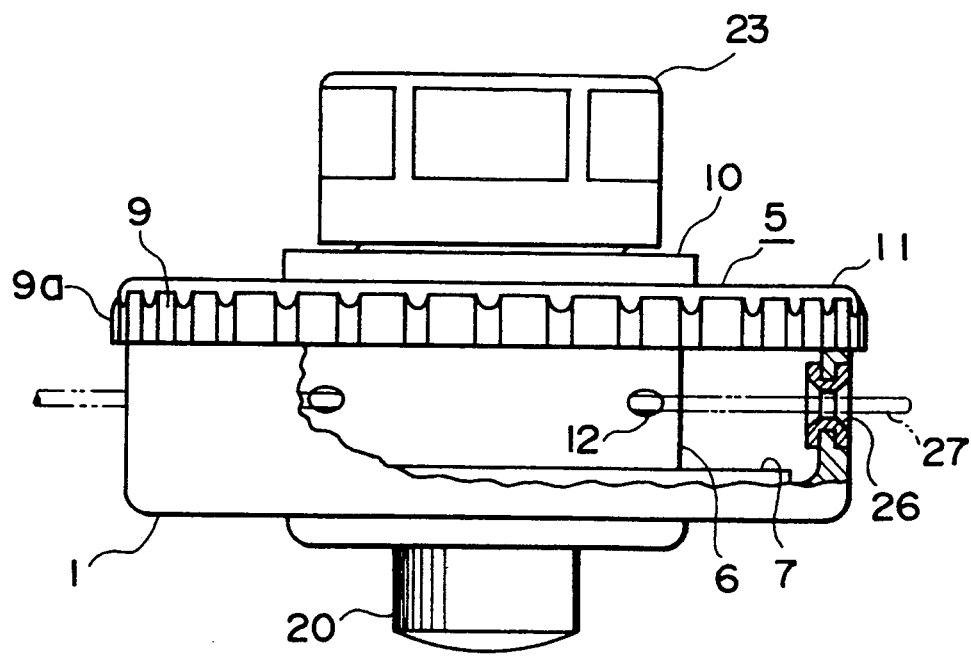
F I G. 3
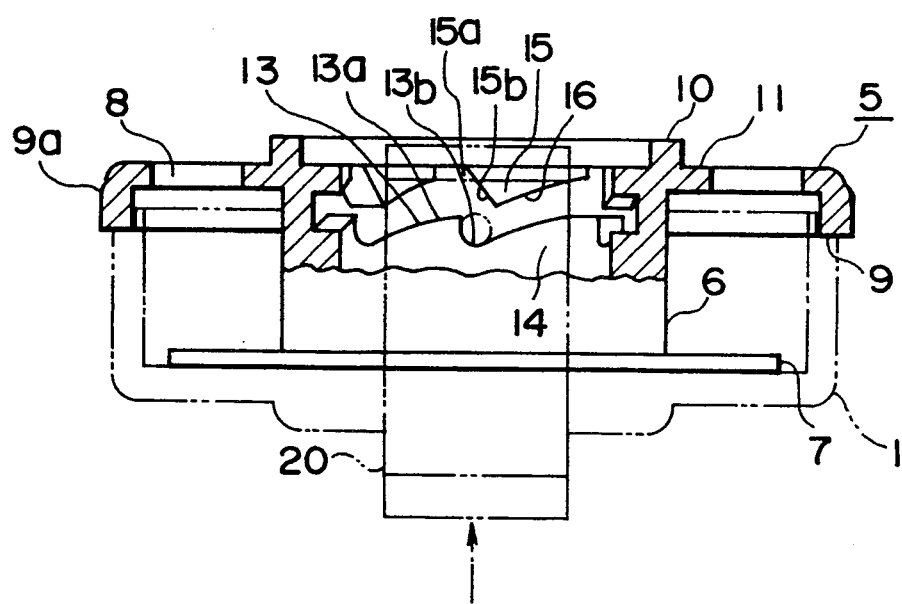
F I G. 4

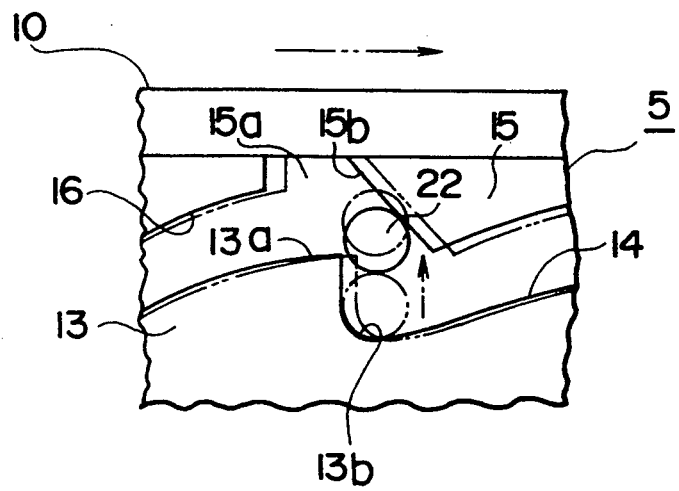
F I G. 5
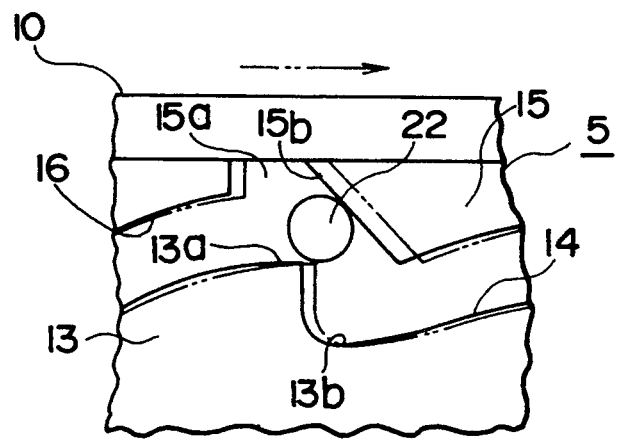
F I G. 6

ROTARY CUTTER FOR MOWING MACHINE

TECHNICAL FIELD

The present invention relates to a rotary cutter for a mowing machine which mows weeds and lawns by using a cord cutter.

BACKGROUND ART

To mow weeds and lawns around a wall, a fence, an iron pole, or the like, or at a place where many obstacles exist, if a metallic (usually stainless steel) blade is used, sometimes the blade is chipped or pieces of an object cut by the blade are scattered to pose a danger. Hence, a cord, e.g., a nylon cord, is used as the cutter.

When a nylon cord is used as the cutter, in this manner, the wearing degree of the wound nylon cord is high, and the nylon cord is replaced every time it is worn. To replace the nylon cord, however, in a conventional rotary cutter, the nylon cord is taken out through a notched portion formed in the flange of the reel. Thus, when the nylon cord is to be replaced, all the components of the rotary cutter must be removed, the reel must be taken out from the case, a new nylon cord must be wound on the reel, and the reel must be set in the case. It is very cumbersome to perform this operation during mowing.

In the conventional rotary cutter, the nylon cord is extracted from the reel by the centrifugal force which is generated upon rotation of the rotary cutter when the mowing machine is operated. Thus, when the nylon cord is to be extracted because it has become short, a terminal member must always be pressed during rotation of the rotary cutter. During the extraction operation, the rotary cutter is not stably supported because it is rotated. When the terminal member is struck against a hard ground, not only the terminal member but also the case body is undesirably struck to damage the case body and the terminal member, causing a crack in or damaging them. Then, the rotary cutter becomes defective before it is fully utilized.

If the rotary cutter is not stably supported when the terminal member is struck, stones and lumps of soil are scattered upon striking to endanger the operator or people nearby.

It is an object of the present invention to provide a rotary cutter for a mowing machine in which a cord can be easily replaced, and when a nylon cord as the cutter is worn in an early stage, a necessary amount of nylon cord can be reliably extracted while rotation of the rotary cutter is stopped.

BRIEF DESCRIPTION OF THE DRAWINGS

FIGS. 1 to 6 show a rotary cutter for a mowing machine according to an embodiment of the present invention, in which FIG. 1 is an overall longitudinal sectional view;

FIG. 2 is a partially cutaway plan view;

FIG. 3 shows a state in which a nylon cord is mounted;

FIG. 4 is a sectional view of a stopper pin guide portion;

FIG. 5 is a view showing an operating state of the first stage of the stopper pin when a main shaft is depressed; and FIG. 6 is a view showing an operating state of the second stage of the stopper pin when the main shaft is depressed.

EMBODIMENT

An embodiment of the present invention will be described with reference to the accompanying drawings.

Figure 1:
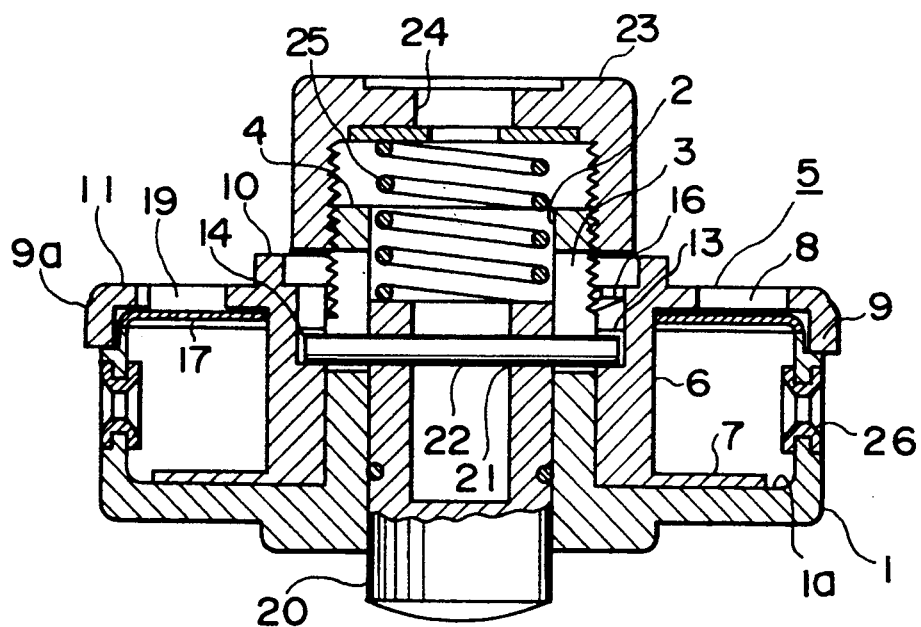
Figure 2:
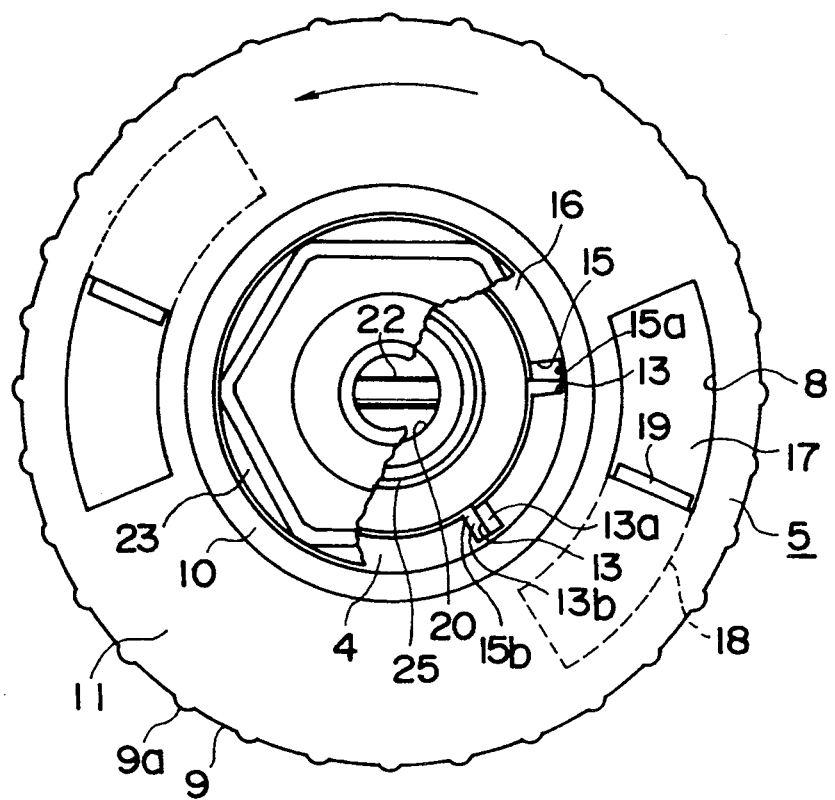

Referring to FIGS. 1 to 6, reference numeral 1 denotes a cylindrical case body having one open end and a bottom surface 1a. A bearing 4 is provided to vertically stand on a central portion of the bottom surface 1a of the case body 1. A vertical axial hole 2 having two open ends and a keyway is formed in the bearing 4. A pair of elongated holes 3 are formed in the inner circumferential surface of the axial hole 2 to oppose each other at appropriate portions in the longitudinal direction of the bearing 4. A left-handed thread is formed on the outer circumferential surface of the bearing 4. Reference numeral 5 denotes a whole portion of a reel. A receptacle flange 7 is provided to the lower end of a cylindrical take-up member 6 to be capable of being inserted in the case body 1, and a support flange 11, having a plurality of trapezoidal transparent windows 8 of arbitrary sizes that allow internal observation, an outer frame 9 provided with antiskid members 9a on its outer periphery, and an annular projection 10 on its upper surface, is formed at the upper end of the member 6 such that the outer frame 9 is located on the lower side. A through hole 12 is formed in the boss portion of the cylindrical member 6 to be perpendicular to the axis of rotation, that is, to extend horizontally and not to extend through the inner side surface of the boss portion. A guide member 14 having a large number of annularly arranged pawls 13 is provided on the lower surface of an annular recessed portion formed in the inner circumferential surface of the cylindrical member 6. A pin press 16 comprising a large number of pawl presses 15 provided at suitable intervals to correspond to the pawls 13 is provided on the upper surface of the annular recessed portion. Gaps 15a between the pawl presses 15 and corresponding to mountain portions 13a of the pawls 13 are set to have arbitrary sizes and to oppose these mountain portions 13a. End portions 15b of the pawl presses 15 corresponding to trough portions 13b of the pawls 13 are set inclined at an appropriate acute angle $\theta$ with respect to the upper surface of the support flange 11. The reel 5 is rotatably housed in the case body 1 by supporting its outer frame 9 on the end face of the case body 1.

Reference 17 denotes a transparent auxiliary flange having a thickness falling within the height of the outer frame 9. A plurality of auxiliary windows 18 are formed in the auxiliary flange 17 to correspond to the windows 8. Handles 19 are provided to the auxiliary flange 17 to be movable between the support flange 11 and the reception flange 7 on the side of the windows 8.

Reference numeral 20 denotes a main shaft in which a keyway is formed in its outer circumferential surface and a pin hole 21 is formed at its appropriate portion near its upper end to extend in the radial direction. The main shaft 20 is inserted in the axial hole 2 to be vertically movable. A stopper pin 22 having a length slightly smaller than the distance between the opposing notches 15a is inserted in the pin hole 21 through the elongated holes 3, thereby preventing the main shaft 20 from dropping.

Reference numeral 23 denotes a rotary cap connected to a driving unit (not shown). The cap has an insertion hole 24 having an appropriate size at its central portion, and an outer diameter smaller than the inner diameter of the projection 10. A coil spring 25 inserted between the inner bottom surface of the cap and the upper end face of the main shaft 20 is compressed when the cap 23 is threadably engaged with the bearing 4.

Reference numerals 26 denote a plurality of (two in FIG. 1) cylindrical guide cylinders each having an appropriate inner diameter and conical guide recesses at its two ends. The cylindrical guide cylinders 26 are provided at positions (generally, at positions corresponding to the through hole 12) of an appropriate height in the side surface of the case body 1.

Reference numeral 27 denotes a rope-like nylon cord having an appropriate length. The nylon cord 27 can be pulled out through a guide cylinder 26, the through hole 12, and another guide cylinder 26 and can be wound on the cylindrical member 6. Hence, an appropriate amount of the nylon cord 27 is extracted outside the case body 1 and used as the cutter.

In actual use, when the nylon cord 27 becomes short and must be replaced, the reel 5 is rotated by the operation of the antiskid members 9a to align the through hole 12 with the guide cylinders 26, the old nylon cord is removed, one end of a new nylon cord 27 is inserted in the through hole 12 through one guide cylinder 26 and extracted outside through another guide cylinder, so that the case body 1 is set at substantially the central portion of the nylon cord 27, as shown in FIG. 3.

When the reel 5 is rotated counterclockwise (a direction of an arrow in FIG. 2) by the operation of the antiskid members 9a, the stopper pin 22 is moved up and down along the elongated holes 3 while it is urged by the pawls 13 of the guide member 14, and the coil spring 25 is urged by the inserted main shaft 20 to rotate the reel 5, thereby winding the nylon cord 27 on the cylindrical member 6. At this time, when the stopper pin 22 is located at a trough portion 13b of a pawl 13, the stopper pin 22 is biased by the coil spring 25 to engage with this through portion 13b, and the reel 5 is prohibited from rotating in the forward direction but continues to rotate in only the reverse direction (counterclockwise) to sequentially take up the nylon cord 27. The two ends of the nylon cord 27 are extracted from the guide cylinder 26 by appropriate amounts, and used.

Furthermore, when the two end portions of the nylon cord 27 extending from the case body 1 are shortened by use, the operation of the rotary cutter is stopped by the driving unit and the main shaft 20 is pressed by striking it against the ground. Then, the stopper pin 22 engaged with the pawl 13 at a trough portion 13b is moved upward to abut against an inclined end portion 15b, and urges a pawl press 15, as indicated by a long and two short dashed line in FIG. 5, to slightly rotate the reel 5 clockwise. At the same time, the stopper pin 22 is moved onto the mountain portion 13a of this pawl 13 by the reaction of the urged pawl press 15, as shown in FIG. 6. Hence, even if the force to urge the main shaft 20 is removed and the main shaft 20 is biased by the coil spring 25, the stopper pin 22 is not moved but stays on the mountain portion 13a.

At this time, when the two ends of the nylon cord 27 are pulled, the reel 5 runs idle clockwise by a distance corresponding to a distance along which the stopper pin 22 is moved from the mountain portion 13a to the trough portion 13b along the pawl 13 between the guide member 14 and the pin stopper 16. The nylon cord 27 is extracted from the guide cylinders 26, the main shaft 20 is biased by the compression force of the coil spring 25, and the stopper pin 22 abuts against the trough portion 13b to engage with the trough portion 13b, thereby stopping forward rotation of the reel 5.

In this state, when the driving unit is operated, the rotary cutter can perform lawn mowing again.

In an actual work, if the driving unit is operated when the stopper pin 22 is moved onto the mountain portion 13a to start lawn mowing, the reel runs idle because of the centrifugal force and the tensile force generated when the nylon cord 27 abuts against the grass. Thus, the nylon cord 27 is extracted from the guide cylinders 26 in accordance with the same operation as described above.

When the extraction amount of the nylon cord 27 is excessive, the reel 5 may be rotated in the reverse direction to take up the nylon cord 27 until the two projecting ends of the nylon cord 27 become predetermined lengths. The projection 10 prevents mowed grasses from winding on the bearing 4 and the stopper pin 22 from dropping.

When the nylon cord 27 is cut in the case body 1 near the outlet of a guide cylinder 26, the windows 8 and the auxiliary windows 18 may be aligned, and the nylon cord 27 may be held by a separate tool (e.g., tweezers or a nipper) and extracted from the guide cylinder 26 while observing it through a window 8.

As has been described above, according to the present invention, a nylon cord can be extracted by a predetermined length or replaced during an operation at a work site upon stopping rotation of the rotary cutter and by an easy operation without the trouble of disassembling components that are once assembled and without requiring time needed for such disassembly and re-assembly. In addition, mowing can be enjoyably and comfortably performed without damaging the case body or the like and endangering the operator or people nearby. Thus, the present invention is very advantageous in practice.

I claim:

1. A rotary cutter for a mowing machine, comprising:
   a bearing;
   a reel, which is supported on said bearing to be rotatable about said bearing, and on which a cord cutter is wound;
   a housing for receiving the reel to be relatively rotatable, and having a pair of through holes which oppose with each other and through which both end portions of the cord cutter are outwardly extended;
   means for limiting said bearing and said reel to allow said reel to rotate in only one direction and upon rotation of said bearing, rotating said reel;
   means for canceling limitation by said limiting means and rotating said reel in a reverse direction with respect to said bearing when said bearing is moved in an axial direction thereof with respect to said reel; and
   a through hole formed in the reel having a pair of openings, through which the intermediate portion of the cord cutter passes so that the cord cutter is held by the reel at the intermediate portion, a line passing the paired openings being shifted from a line of a diameter of the reel.

2. A rotary cutter comprising:
   a cylindrical case body (1) including a central axis, an outer peripheral wall and an inner cylindrical bearing (4) which are coaxial with the central axis, the outer peripheral wall having a pair of guide through holes (26) for a cord (27) to be opposite to each other, and the inner cylindrical bearing (4) having a pair of elongated holes (3) extending along the central axis and opposing with each other;

a cylindrical take-up member (6) having an outer peripheral surface, on which the cord is wound, and inner peripheral surface, in which said bearing (4) is coaxially and slidably inserted;

a main shaft (20) coaxially and slidable inserted in the take-up member (6) and having a pair of through pin-holes (21) opposing with each other;

first and second guide members formed in the inner peripheral surface of the take-up member and having a pair of groups of first and second pawls arranged to face with each other along the central axis with each other to define a circular space therebetween and a portion between the adjacent pawls, the first pawls and second pawls to be shifted in the circumferential direction;

a stopper pin (22) inserted through the pin-holes (21) and elongated holes (3), and having opposite end portions positioned in the circular space; and means (25) for biasing the main shaft (20) to abut the end portions of the stopper pin onto the portion of the first guide member between the adjacent pawls, the first and second pawls holding the stopper pin therebetween when the main shaft is axially moved against the force of the biasing means, wherein said cylindrical take-up member (6) includes a through hole (12) having a pair of openings exposed in the outer peripheral surface of the take-up member, through which the intermediate portion of the cord passes so that the cord is held by the take-up member at the intermediate portion, a line passing the paired openings being shifted from a line of a diameter of the take-up member.

* * * * *